(12) United States Patent
Chuang et al.

(10) Patent No.: US 7,585,108 B2
(45) Date of Patent: Sep. 8, 2009

(54) PROBE COVER FOR EAR THERMOMETER AND MANUFACTURING METHOD THEREOF

(75) Inventors: Li-Heng Chuang, Hsinchu (TW); Liang-Yi Li, Hsinchu (TW)

(73) Assignee: Actherm Inc., Hsinchu (TW)

( * ) Notice: Subject to any disclaimer, the term of this patent is extended or adjusted under 35 U.S.C. 154(b) by 0 days.

(21) Appl. No.: 12/110,307

(22) Filed: Apr. 26, 2008

(65) Prior Publication Data
US 2009/0129437 A1 May 21, 2009

(30) Foreign Application Priority Data
Nov. 15, 2007 (TW) ............... 96143163 A (51) Int. Cl.
*G01K 1/08* (2006.01)
(52) U.S. Cl. ...................... 374/158; 374/209
(58) Field of Classification Search .............. 374/158, 374/209
See application file for complete search history.

(56) References Cited

U.S. PATENT DOCUMENTS

| | | | |
|---|---|---|---|
| 6,139,182 A * | 10/2000 | Levatter et al. | 374/158 |
| 6,192,734 B1 | 2/2001 | Rothfritz | |
| 6,224,256 B1 | 5/2001 | Bala | |
| 6,226,541 B1 | 5/2001 | Eppstein | |
| 6,238,088 B1 | 5/2001 | Wu | |
| 6,254,271 B1 | 7/2001 | Lin | |
| 6,319,206 B1 | 11/2001 | Pompei | |
| 6,371,639 B1 | 4/2002 | Huang | |
| 6,386,757 B1 | 5/2002 | Konno | |
| 6,390,671 B1 | 5/2002 | Tseng | |
| 6,435,711 B1 | 8/2002 | Gerlitz | |
| 6,647,284 B1 | 11/2003 | Lee | |
| 6,695,474 B2 | 2/2004 | Beerwerth | |
| 6,811,306 B2 | 11/2004 | Gerlitz | |
| 6,882,873 B2 | 4/2005 | Samuels | |
| 6,932,775 B2 | 8/2005 | Pompei | |
| 6,991,368 B2 | 1/2006 | Gerlitz | |
| 7,025,500 B2 | 4/2006 | Tabata | |
| 7,108,419 B2 | 9/2006 | Harr | |
| 7,237,949 B2 | 7/2007 | Lantz | |

\* cited by examiner

*Primary Examiner*—Gail Verbitsky
*Assistant Examiner*—Mirellys Jagan
(74) *Attorney, Agent, or Firm*—Ming Chow; Sinorica, LLC (57) ABSTRACT

The present invention provides a probe cover for an ear thermometer and a manufacturing method thereof. The probe cover is for sheathing a measuring probe of the ear thermometer, and an engaging means is provided at a bottom of the measuring probe. The probe cover comprises a main body of a hollow structure, an abutting segment and a base. Therein, the main body has an open end and a closed end opposite to the open end. An assembling direction extending from the open end toward the closed end is where the measuring probe is assembled along. Further, the main body has a diameter gradually reducing along the assembling direction. The closed end allows infrared rays to be received by the measuring probe to pass therethrough. Therein, the abutting segment is provided at the open end of the main body, and the base is annularly provided around a periphery of the abutting segment. The probe cover is characterized in being integrally formed, and having an annular shoulder provided at the abutting segment for accommodating the engaging means of the ear thermometer, as well as a plurality of separated protuberances, which are formed inwardly at a combining portion between the abutting segment and the base, for being engaged with the engaging means of the ear thermometer so that the probe cover can be firmly engaged with the measuring probe.

12 Claims, 7 Drawing Sheets

--Prior Art--

Fig.1A

--Prior Art--

PROBE COVER FOR EAR THERMOMETER AND MANUFACTURING METHOD THEREOF

BACKGROUND OF THE INVENTION

1. Technical Field

The present invention relates to a probe cover for an ear thermometer and a manufacturing method thereof. More particularly, the present invention relates to a probe cover for an ear thermometer having protuberances provided at a combining portion between an abutting segment and a base for coupling with an engaging means of the ear thermometer.

2. Description of Related Art

Figure 1A:
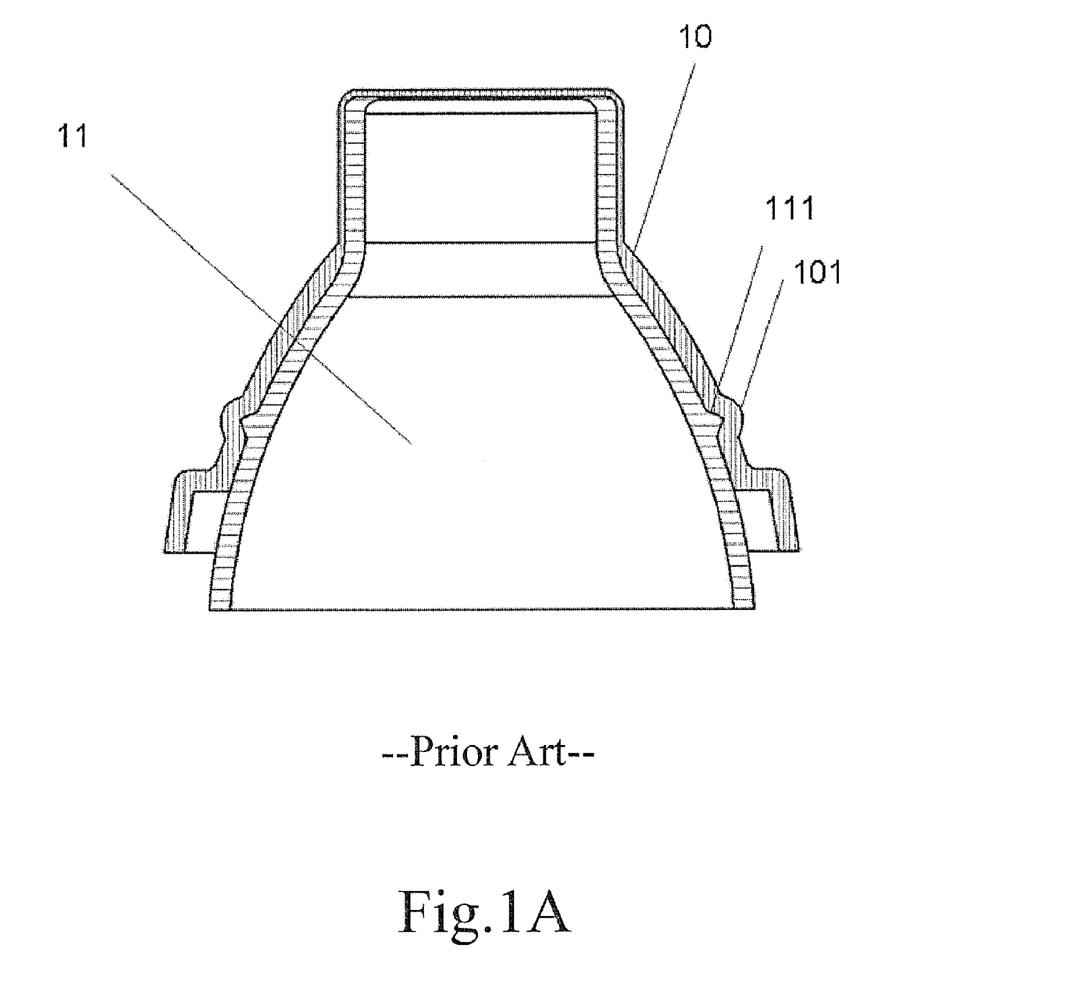
FIG. 1A is a sectional view of a conventional probe cover for an ear thermometer.
Figure 1B:
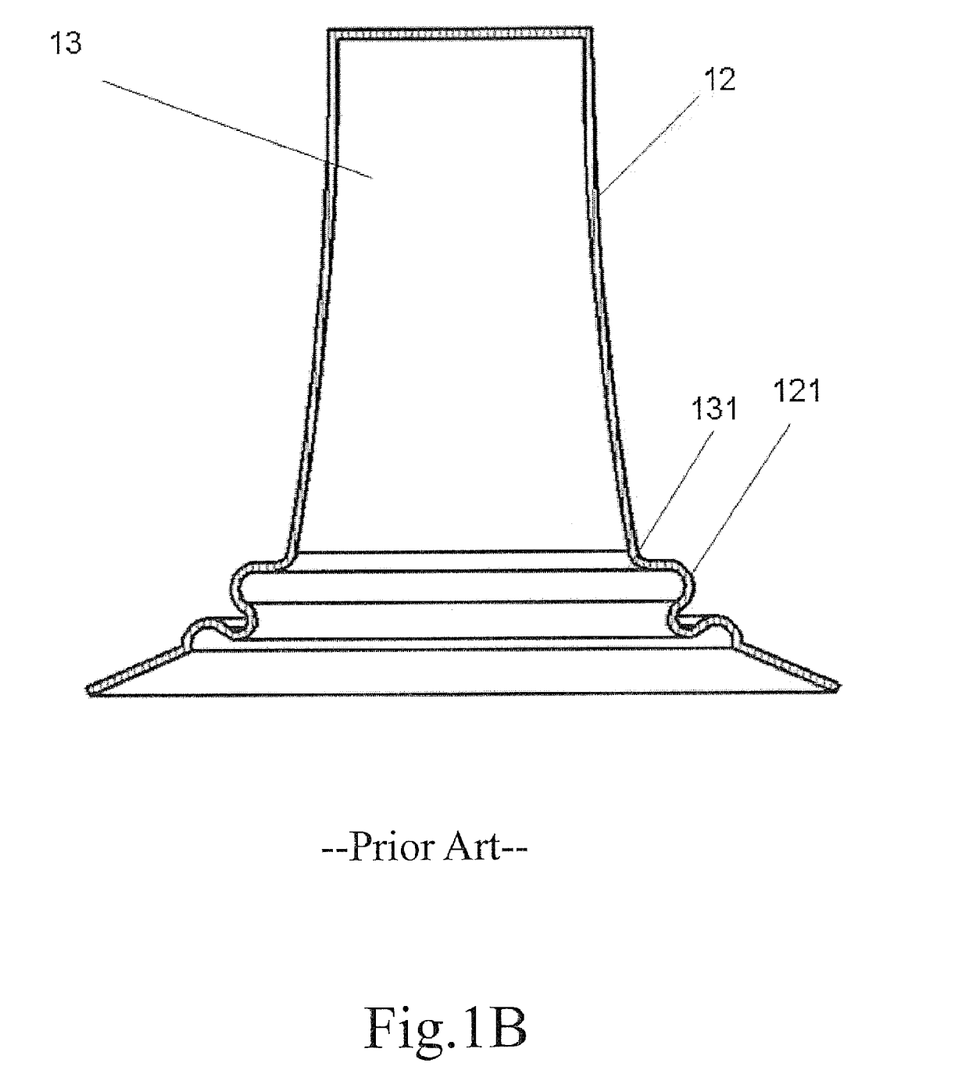
FIG. 1B is a sectional view of another conventional probe cover for an ear thermometer.

The know probe cover for an ear thermometer may be of a multi-component type, such as the one disclosed in U.S. Pat. No. 4,911,559. Such probe cover of the multi-component type requires relatively complex processing procedures and may have intervals at joints between combined components that bring discomfort to human ears, thereby being disadvantageous in view of ergonomics. To remedy the above problems, U.S. Pat. No. 5,088,834 disclosed a unitary probe cover 10. Further, for ensuring firm combination between the probe cover 10 and a measuring probe 11, an annular groove 101 is provided on the probe cover 10 and a raised engaging means 111 is provided on the measuring probe 11, as shown in FIG. 1A. Therein, the annular groove 101 has an inner diameter equal to an outer diameter of the engaging means 111 so that when the probe cover 10 is assembled to the measuring probe 11, the engaging means 111 of the measuring probe 11 can be engaged with the annular groove 101 of the probe cover 10, resulting in firm combination between the probe cover 10 and the measuring probe 11. Besides, U.S. Pat. No. 6,022,140 also provides a probe cover 12 for an ear thermometer having an annular groove 121, as shown in FIG. 1B, so that when the annular groove 121 of the probe cover 12 is engaged with an engaging means 131 of a measuring probe 13, the probe cover 12 is firmly assembled to the ear thermometer.

However, the annular grooves 101 and 121 taught by U.S. Pat. No. 5,088,834 and U.S. Pat. No. 6,022,140 have some defects. The first problem is that during manufacturing such probe covers, the annular groove can tightly cover the mould, and thereby a relative large ejection force is required for forced demoulding. Thus, the manufacturing is relatively difficult and the overall processing time can be significantly increased. Secondarily, for mating such probe covers, the engaging means of the measuring probe may have an annular shape. Therefore, when the probe cover is assembled to or disassembled from the ear thermometer, a relatively large force is required to completely inserting the engaging means into the annular groove or depart the engaging means from the annular groove, thereby causing inconvenient operation. Thirdly, for reducing the required force for operation, the engaging means may be formed as two protuberances for being engaged with the annular groove of the probe cover instead of the annular shape as described above. However, each time the probe cover is assembled to the measuring probe, the annular groove rubs against the protuberances of the engaging means so that after long-term use, the two protuberances of the engaging means can be gradually worn and torn to deformed. Finally, the annular groove can not tightly cover the engaging means and the probe cover becomes liable to come off the ear thermometer.

SUMMARY OF THE INVENTION

To remedy the problems of the prior arts, the present invention provides a probe cover for an ear thermometer and a manufacturing method thereof. The probe cover is for sheathing a measuring probe of the ear thermometer, and an engaging means is provided at a bottom of the measuring probe. The probe cover comprises a main body of a hollow structure, an abutting segment and a base. Therein, the main body has an open end and a closed end opposite to the open end. An assembling direction extending from the open end toward the closed end is where the measuring probe is assembled along. Further, the main body has a diameter gradually reducing along the assembling direction. The closed end is provided for allowing infrared rays to be received by the measuring probe to pass therethrough. Therein, the abutting segment is provided at the open end of the main body, and the base is annularly provided around a periphery of the abutting segment. The probe cover is characterized in being integrally formed, and having an annular shoulder provided at the abutting segment for accommodating the engaging means of the ear thermometer, as well as a plurality of separated protuberances, which are formed inwardly at a combining portion between the abutting segment and the base, for being engaged with the engaging means of the ear thermometer.

Thus, it is one objective of the present invention to provide a probe cover for an ear thermometer having a plurality of protuberances provided at a combining portion between an abutting segment and a base for coupling with an engaging means of the ear thermometer so that the probe cover can be engaged with the measuring probe of the ear thermometer firmly.

It is another objective of the present invention to provide a probe cover for an ear thermometer having a plurality of protuberances, wherein a smaller ejection force for demoulding the probe cover out of a mold than that required by a conventional probe cover having an annular groove so as to facilitate manufacturing and therefore saving processing time.

It is still another objective of the present invention to provide a probe cover for an ear thermometer having a plurality of protuberances provided at an abutting segment so that contacting positions between an engaging means of the ear thermometer assembled and the probe cover are varied when every time the engaging means is assembled by one said probe cover. As a result, abrasion caused by the probe covers to the engaging means can be dispersed and therefore the engaging means is endowed with enhanced lifetime.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENT

While the present invention discloses a probe cover for an ear thermometer and a manufacturing method thereof, it is to be stated first of all that the basic principle where the ear thermometer operates upon have been familiar to people skilled in the art and need not be discussed at length herein. Meantime, while the accompanying drawings are provided for the purpose of illustration, it is to be understood that the drawings are directed to the characteristics of the present invention and need not to be made in scale.

Please refer to FIGS. 2A to 2E for a first embodiment of the present invention. Therein, a probe cover 2 for an ear thermometer has a main body 23 of a hollow structure, an abutting segment 24 and a base 25 for sheathing a measuring probe 201 of the ear thermometer 20. Further, an engaging means 202 is provided at a bottom of the measuring probe 201.

The engaging means 202 may be shaped as an annulation, a dot or a block while the engaging means 202 is not an essential component of the measuring probe 201.

Figure 2A:
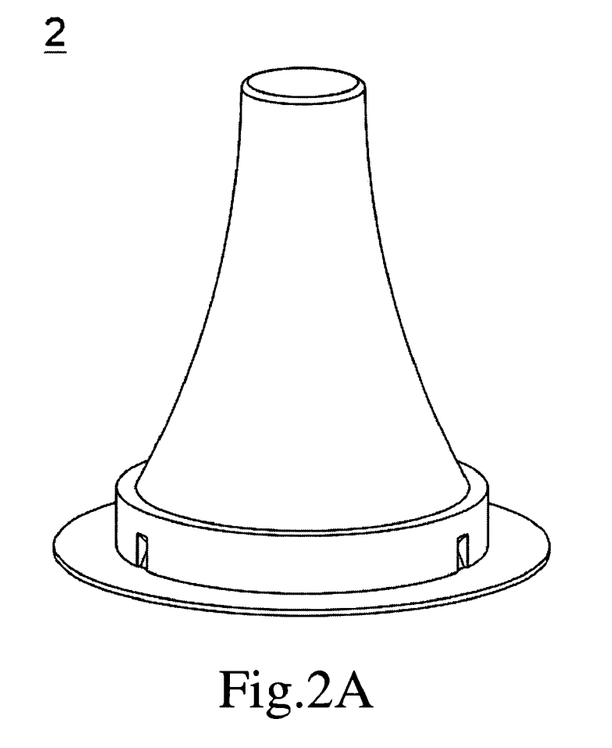
FIG. 2A is a perspective view of a probe cover for an ear thermometer according to a first embodiment of the present invention.

The main body 23 is integrally formed and has an open end 231 as well as a closed end 232 opposite to the open end 231 so as to present an appearance of a short truncated cone, as shown in FIG. 2A. An assembling direction Y extending from the open end 231 toward the closed end 232 is where the measuring probe 201 is assembled along. The main body 23 has a diameter gradually reducing along the assembling direction (as indicated by Arrow Y in FIG. 2D). The main body 23 may be made of a material selected from polyethylene (PE), polypropylene (PP), polycarbonate (PC), polystyene (PS), poly ethylene terephthalate (PET) and poly vinyl chioride (PVC) that infrared rays can be transmitted therethrough. Preferably, the main body 23 has a thickness gradually reducing from the open end 231 toward the closed end 232.

Figure 2B:
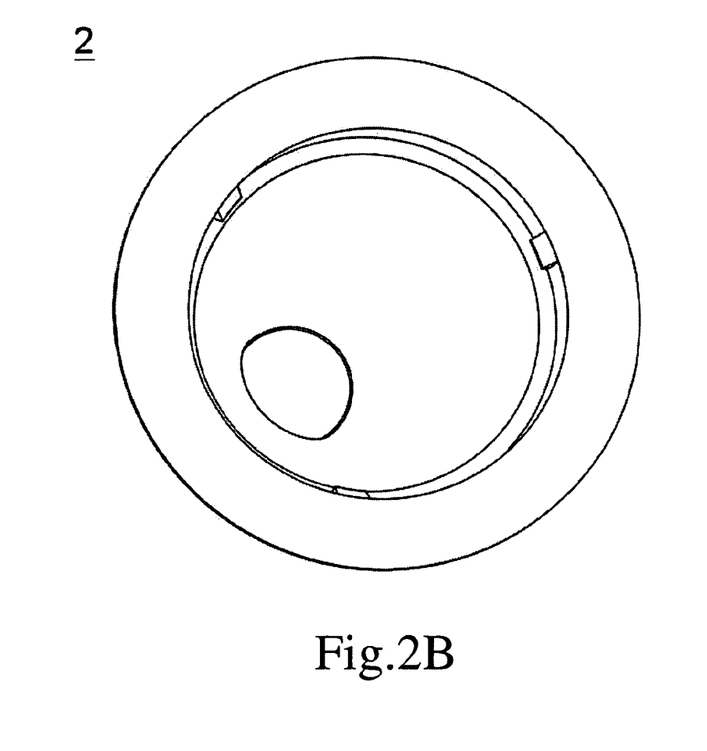
FIG. 2B is a bottom view of the probe cover for an ear thermometer according to the first embodiment of the present invention.
Figure 2C:
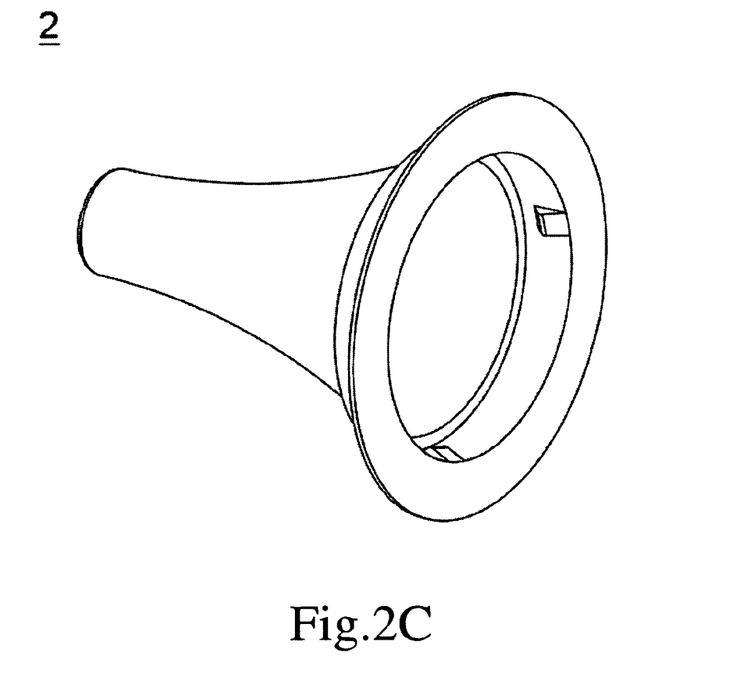
FIG. 2C is another perspective view of the probe cover for an ear thermometer according to the first embodiment of the present invention.
Figure 2D:
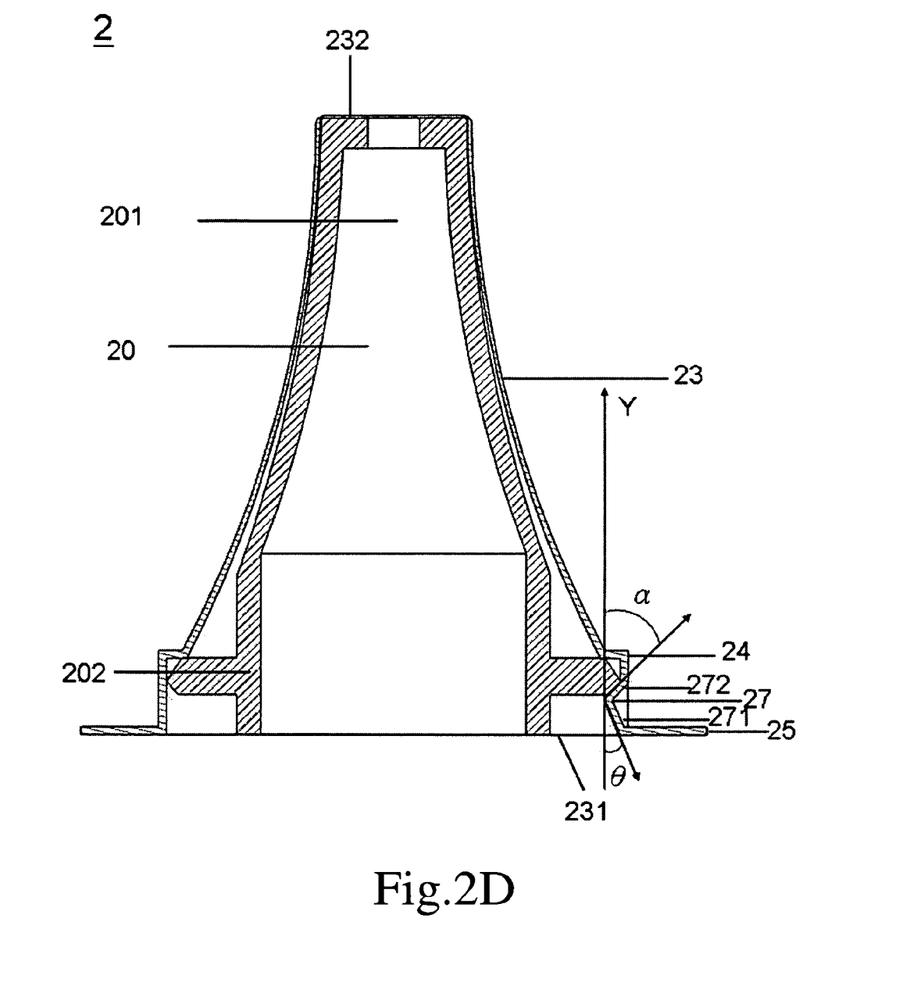
FIG. 2D is a sectional view of the probe cover for an ear thermometer according to the first embodiment of the present invention.

The closed end 232 is provided for allowing infrared rays to be received by the measuring probe 201 to pass therethrough.

The abutting segment 24 is provided at the open end 231 of the main body 23, and has an annular shoulder for accommodating the engaging means 202 of the ear thermometer 20.

The base 25 is annularly provided around a periphery of the abutting segment 24.

Figure 2E:
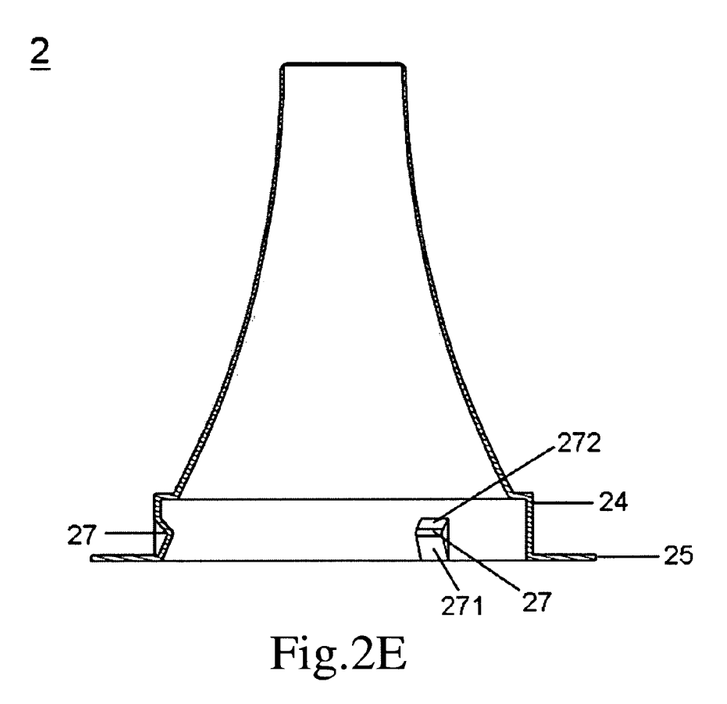
FIG. 2E is a schematic drawing showing the probe cover for an ear thermometer according to the first embodiment of the present invention.

For avoiding the problem that the engaging means 202 of the ear thermometer 20 gets worn and torn by being frequently assembled and disassembled with the probe cover 2 after long-term use, a plurality of separated protuberances 27 are formed inwardly at combining portion between the abutting segment 24 and the base 25, for being engaged with the engaging means 202 of the ear thermometer 20. Therefore, the probe cover 2 can be firmly assembled to the measuring probe 201 with reduced risk of coming off. Furthermore, in each time of assembling the probe cover 2, the protuberances 27 contact different positions of the engaging means 202, so that the engaging means 202 will not be worn and torn soon so as to lengthen the lifetime of the ear thermometer 20. In addition, when the protuberances 27 are moulded, a relative smaller force is required for demoulding than that required by a conventional probe cover having an annular groove so as to facilitate manufacturing. Therein, the protuberances 27 are preferably configured with equal distances therebetween. However, the protuberances 27 may be alternatively configured with unequal distances therebetween. Therein, the number of the protuberances 27 is preferably three (referring to FIGS. 2B and 2C). Alternatively, the number of the protuberances 27 is two and the protuberances 27 are approximately positioned at two ends of a diameter of the abutting segment 24. Therein, each of the protuberances 27 may be formed by directly making the abutting segment 24 depressed inwardly, as shown in FIG. 2E. Therein, each of the protuberances 27 may have a sectional shape taken along the assembling direction Y as a cone, as shown in FIG. 2B.

For enhancing firmness of the combination, the protuberance 27 may have a guiding surface 271 facing the base 25 and an retaining surface 272 facing the main body 23, as shown in FIG. 2D. Therein, a first included angle θ and a second included angle α are formed respectively between the guiding surface 271 as well as the retaining surface 272 and the assembling direction Y. When the first included angle θ is smaller than the second included angle α, the guiding surface 271 has a relative large gradient that helps the measuring probe 201 to be smoothly inserted into the probe cover 2 so as to save effort for assembling the probe cover 2. After the probe cover 2 is assembled, since the retaining surface 272 has a relative small gradient, it retains the engaging means 202 of the ear thermometer 20 from coming off the abutting segment 24 so that the probe cover 2 can be assembled firmly. While the above description provides a preferable embodiment, it is to be understood that in an alternative embodiment, the first included angle θ may be equal to or greater than the second included angle α.

To allow infrared rays to stably pierce through the closed end 232, the probe cover 2 may be such configured that a length from the retaining surface 272 to the closed end 232 is smaller than a length of the measuring probe 201 from a lower edge of the engaging means 202 to an upper edge of the measuring probe 201. Thereby, when the probe cover 2 is assembled to the measuring probe 201, the engaging means 202 of the ear thermometer 20 abuts the retaining surface 272. At this time, the abutting segment 24 and a side wall of the probe cover 2 are lengthened to become deformed. Meanwhile, the closed end 232 receives a radial external force and is pulled outward to become deformed so as to present a smooth surface, thereby allowing infrared rays to pierce therethrough with enhanced stability.

According to the first embodiment, the present invention further provides a manufacturing method of the probe cover 2 for sheathing the measuring probe 201 of the ear thermometer 20, wherein an engaging means 202 is provided on a bottom of the measuring probe 201 and the manufacturing method comprises:

(1) providing a main body 23 of a hollow structure, having an open end 231 and a closed end 232 opposite to the open end 231, wherein an assembling direction Y extending from the open end 231 toward the closed end 232 is where the measuring probe 201 is assembled along and the main body 23 has a diameter gradually reducing along the assembling direction Y while the closed end 232 is provided to allow infrared rays to be received by the measuring probe 201 to pass therethrough;

(2) providing an abutting segment 24, deposited at the open end 231 of the main body 23; and (3) providing a base 25, annularly provided around a periphery of the abutting segment 24;

wherein the probe cover 2 is integrally formed, and the abutting segment 24 has an annular shoulder for accommodating the engaging means 202 of the ear thermometer 20 while a plurality of separated protuberances 27 are formed inwardly at a combining portion between the abutting segment 24 and the base 25, for being engaged with the engaging means 202 of the ear thermometer 20. Besides, the engaging means 202, the main body 23, the protuberances 27, the closed end 232 and other components have the features as those described in the first embodiment.

Although the particular embodiments of the invention have been described in detail for purposes of illustration, it will be understood by one of ordinary skill in the art that numerous variations will be possible to the disclosed embodiments without going outside the scope of the invention as disclosed in the claims.

What is claimed is:

1. A probe cover for sheathing a measuring probe of an ear thermometer, in which an engaging means is provided at a bottom of the measuring probe and the probe cover comprises:

a main body of a hollow structure, having an open end and a closed end opposite to the open end, wherein an assembling direction extending from the open end toward the closed end is where the measuring probe is assembled along, and the main body has a diameter gradually reducing along the assembling direction while the closed end is provided for allowing infrared rays to be received by the measuring probe to pass therethrough;

an abutting segment, deposited at the open end of the main body; and a base, annularly provided around a periphery of the abutting segment;

characterized in that:

the probe cover is integrally formed, and an annular shoulder is provided at the abutting segment for accommodating the engaging means of the ear thermometer while a plurality of separated protuberances are formed inwardly at a combining portion between the abutting segment and the base, for being engaged with the engaging means of the ear thermometer, wherein the protuberances are formed by directly making the abutting segment depressed inwardly, and each of the protuberances has a guiding surface facing the base and an resisting surface facing the main body, and a first included angle is formed between the guiding surface and the assembling direction while a second included angle is formed between the resisting surface and the assembling direction, in which the first included angle is smaller than the second included angle.

2. The probe cover of claim 1, wherein a number of the protuberances is three.

3. The probe cover of claim 1, wherein the protuberances are configured as having equal distances or unequal distances therebetween.

4. The probe cover of claim 1, wherein the protuberance has a sectional shape taken along the assembling direction as a cone.

5. The probe cover of claim 1, wherein the main body is made of a material selected from the group consisting of polyethylene (PB), polypropylene (PP), polycarbonate (PC), polystyene (PS), poly ethylene terephthalate (PET) and poly vinyl chioride (PVC) that infrared rays can be transmitted therethrough.

6. The probe cover of claim 1, wherein when the engaging means of the ear thermometer abuts the resisting surface, the closed end receives an external force and becomes deformed to present a smooth surface so as to allow infrared rays stably pierce therethrough.

7. A manufacturing method of a probe cover for sheathing a measuring probe of an ear thermometer, in which an engaging means is provided at a bottom of the measuring probe and the manufacturing method comprises:

providing a main body of a hollow structure, having an open end and a closed end opposite to the open end, wherein an assembling direction extending from the open end toward the closed end is where the measuring probe is assembled along, and the main body has a diameter gradually reducing along the assembling direction while the closed end is provided for allowing infrared rays to be received by the measuring probe to pass therethrough;

providing an abutting segment, deposited at the open end of the main body; and providing a base, annularly provided around a periphery of the abutting segment;

characterized in that:

the probe cover is integrally formed, and an annular shoulder is provided at the abutting segment for accommodating the engaging means of the ear thermometer while a plurality of separated protuberances are formed inwardly at a combining portion between the abutting segment and the base, for being engaged with the engaging means of the ear thermometer, wherein the protuberances are formed by directly making the abutting segment depressed inwardly, and each of the protuberances has a guiding surface facing the base and an resisting surface facing the main body, and a first included angle is formed between the guiding surface and the assembling direction while a second included angle is formed between the resisting surface and the assembling direction, in which the first included angle is smaller than the second included angle.

8. The manufacturing method of claim 7, wherein a number of the protuberances is three.

9. The manufacturing method of claim 7, wherein the protuberances are configured as having equal distances or unequal distances therebetween.

10. The manufacturing method of claim 7, wherein the protuberance has a sectional shape taken along the assembling direction as a cone.

11. The manufacturing method of claim 7, wherein the main body is made of a material selected from the group consisting of polyethylene (PB), polypropylene (PP), polycarbonate (PC), polystyene (PS), poly ethylene terephthalate (PET) and poly vinyl chioride (PVC) that infrared rays can be transmitted therethrough.

12. The manufacturing method of claim 7, wherein when the engaging means of the ear thermometer abuts the resisting surface, the closed end receives an external force and becomes deformed to present a smooth surface so as to allow infrared rays stably pierce therethrough.

* * * * *